May 23, 1939.  A. E. ROBERT  2,159,636
SIGNAL LIGHT
Filed July 23, 1937    2 Sheets-Sheet 1
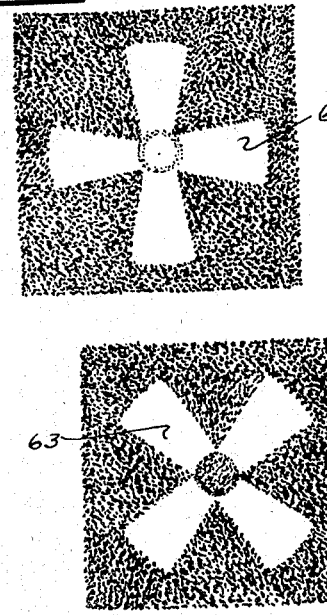
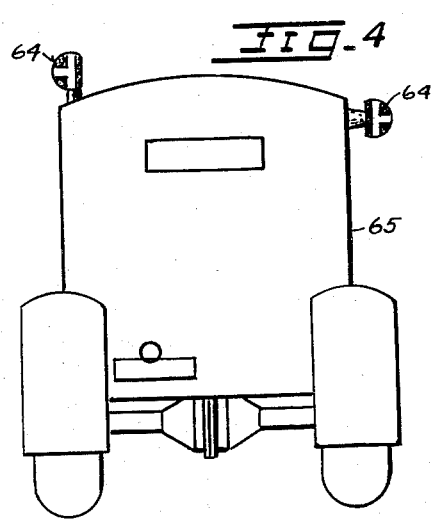
INVENTOR.
AUGUSTA E. ROBERT
BY Henry N. Young
ATTORNEY May 23, 1939.　　　A. E. ROBERT　　　2,159,636
SIGNAL LIGHT
Filed July 23, 1937　　　2 Sheets-Sheet 2
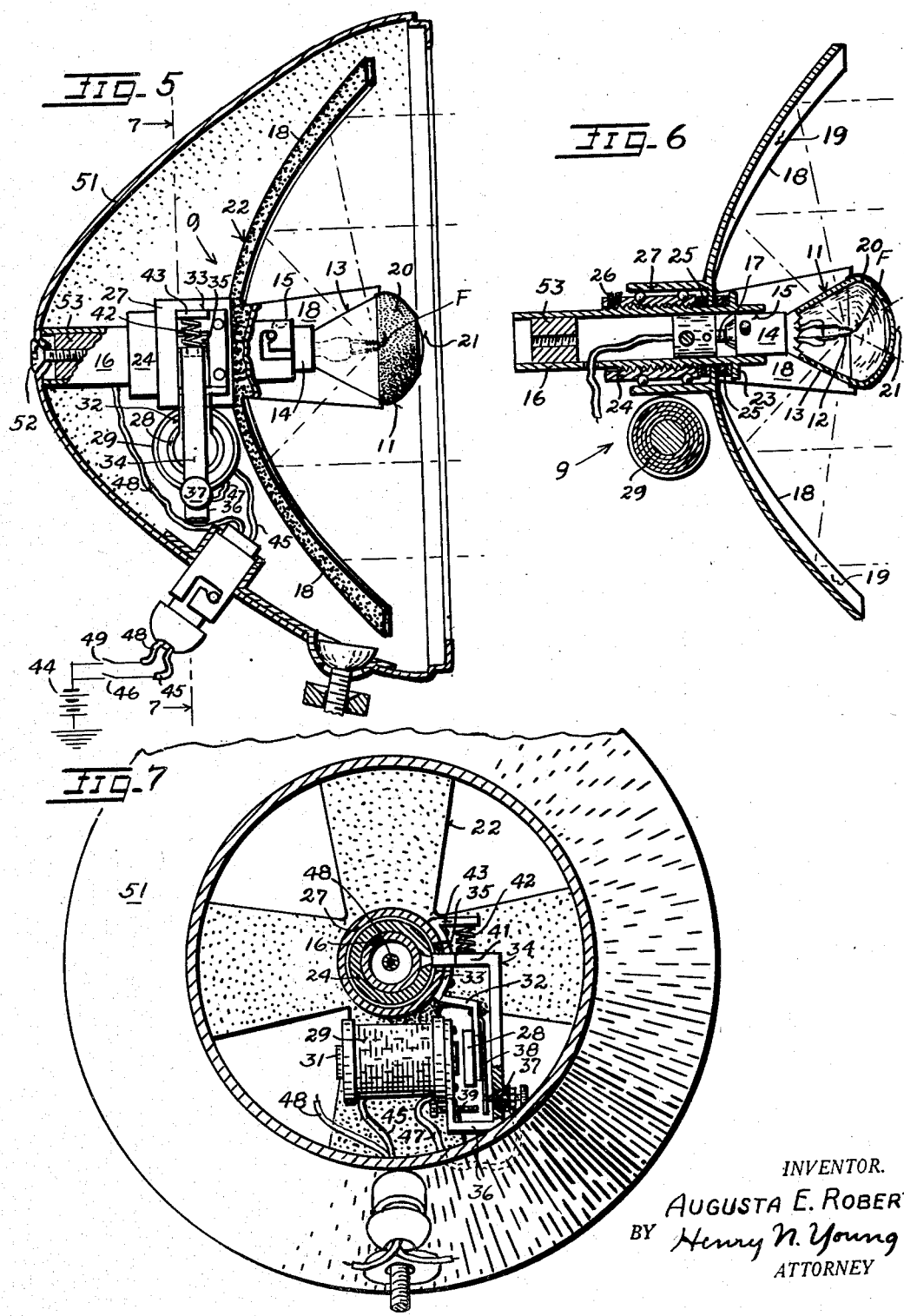
INVENTOR.
AUGUSTA E. ROBERT
BY Henry N. Young
ATTORNEY Patented May 23, 1939

2,159,636

UNITED STATES PATENT OFFICE 2,159,636

SIGNAL LIGHT

Augusta E. Robert, Oakland, Calif.

Application July 23, 1937, Serial No. 155,228

6 Claims. (Cl. 177—329)

The invention relates to a light which is particularly adapted for use as a signal device.

An object of the invention is to provide a signal light which produces an improved type of light image having distinctive characteristics which may be recognized as having signalling significance.

Another object is to provide for a periodic and limited movement of the signal for attracting attention to it without changing its location.

A further object is to provide a signal in which the degree of visibility of the light image is variable in accordance with the position of the beholder with respect to the light beam emanating from the image.

The invention possesses other objects and features of advantage, some of which, with the foregoing, will be set forth or be apparent in the following description of typical embodiments of the invention, and in the accompanying drawings, in which, Figure 1 is a front face view of a signal light embodying the present invention mounted in a protective and supporting casing therefor.

Figures 2 and 3 are full front views of different forms of the signal image as it appears at night.

Figure 4 shows a modified form of the signal light as provided for riding-light and/or direction-signal purposes on a road vehicle.

Figure 5 is a side elevation of the signal unit of Figure 1, the casing being shown in axial section and a reflector portion being broken away.

Figure 6 is an axial section of the signal unit alone.

Figure 7 is a sectional view taken generally at 7—7 in Figure 5.

The features of the present invention are incorporated in a unit 9 which is arranged to reflect light from a single-contact electric lamp 11 to provide my new and distinctive type of signal light image. The lamp 11 is of a usual structure having a loop filament 12 defining a plane including the lamp axis and sealed within a transparent globe 13 which extends from a cylindric base 14 arranged for its removable engagement in a usual lamp socket 15. As shown, the lamp socket 15 is provided in the forward end of a tubular support member 16 which mounts a spring contact 17 for securing the lamp in the socket and providing an electric connection with the central lamp contact, the member 16 being grounded and providing the other electric connection for the lamp by its contact with the metallic tube 16.

A series of reflectors 18 is mounted on the member 16 in radiating relation thereto for reflecting beams of light forwardly from the unit. The reflecting face 19 of each reflector 18 is parabolically curved longitudinally thereof with the focal point F of its parabola substantially at the forward end of the lamp filament 12 as is indicated in Figure 6. Laterally thereof, the reflector faces 19 are also parabolically concave, whereby light received thereat from a source of light at the focal point F may be reflected in laterally non-spreading light bands. Essentially, the reflector surfaces 19 are so formed that light received thereat from the lamp 11 is reflected from each reflector to provide a beam having a cross-section corresponding to the outline of that reflector, and a radial spread determined by the distance of the lamp filament 12 from the focal point F. As particularly illustrated, one pair of reflectors 18 lies in a common plane through the lamp axis and the lamp filament lies in said plane; the latter is preferred since the sharpest possible light beam boundaries are then defined. In the present instance, the reflectors flare outwardly from their inner ends whereby the reflected beams are of generally trapezoidal cross-section.

For producing a sharply defined beam having a section corresponding to the outline of the reflector assembly, an undue direct forward projection of light from the lamp 11 is prevented by a suitable shade means. A separate shade might be provided, but it is preferred to provide an opaque coating 20 on the forward portion of the lamp globe 13; at least the inner face of said coating would be preferably silvered to provide for a maximum conservation of the light emitted forwardly from the lamp filament 12. It will be noted that an aligned pair of reflectors 18 together define a flattened light beam of generally rectangular cross-section, and that the disclosed combination of four reflectors arranged in aligned pairs will cooperatively provide a forwardly directed light beam of cruciform cross-section, the precise outline of such a beam being variable in accordance with the outlines of the reflector.

To avoid a dark spot at the common center of the reflectors behind the lamp, the shading coat 20 may be omitted centrally thereof to provide an axial translucent zone 21 at the front of the lamp whereby a limited amount of light from the lamp filament 12 may escape forwardly from the lamp globe; the zone 21 might be colored, if desired to provide a differently colored center from the cruciform image provided by the reflectors 18. If desired, the globe itself may be slightly frosted to avoid a showing of the filament of the lamp in the reflector images.

It will now be noted that the present reflectors 18 comprise integral parts of a single reflector unit 22 which is centrally perforated to receive the tubular member 16 therethrough for mounting the unit on the member. A flange 23 is fixed on the member 16 adjacent its forward end, and a sleeve member 24 is adjustably mounted on the member rearwardly of the flange 23 whereby the central portion of the member 22 may be engaged and fixedly gripped between the flange and sleeve member. Preferably, and as shown, spacing rings 25 are interposed with the member 22 between the flange 23 and member 24; in this manner, the reflector unit 22 may be adjustably set with respect to a particular lamp filament for providing a light beam with any desired degree of radial spread as determined by the spacing of the filament center with respect to the focal point F. In the present instance, the forward filament end is disposed substantially at the point F. When it is properly disposed with respect to the lamp filament, the reflector unit 22 may be clamped in rotatively adjusted position on the support tube 16; in the present instance, the sleeve 24 threadedly engages the member 16 and a set-screw 26 mounted on the sleeve is operable against the tube 16 to lock the sleeve in set position on the tube.

Since the present unit is primarily designed for use as a light signal, means thereof are provided for agitating the signal for attracting attention to it. In the present instance, the reflector unit 22 is arranged for its periodic oscillation about the tube 16 by a suitable motor means; for this purpose, the member 22 is not clamped in place on the tube 16, but is left free to rotate thereon while it is held against longitudinal shifting on the tube.

An anti-friction bearing means is preferably provided for the oscillatable reflector unit 22, and the latter is accordingly provided with a rearward sleeve extension 27 which freely receives the sleeve 24 in co-axial relation therewith. Bearing races are provided around the exterior of the sleeve 24, and ball bearings in the races engage the bore of the sleeve 27 to provide an anti-friction mounting for the reflector unit 22; it will be understood that the present bearing arrangement permits any necessary adjustment of the mounted reflector unit longitudinally of the sleeve 24.

For effecting an oscillation of the reflector unit 22 in the described manner, said unit is shown as mounting the armature 28 of an electromagnet in fixed relation thereto and for control through an alternate energizing and de-energizing of the magnetic core 31 of a fixed coil 29; as particularly shown, the armature 28 is carried by an arm 32 provided by a member 33 fixed on the sleeve 27. The coil 29 is preferably mounted on the support tube 16; as shown, a coil-supporting arm 34 extends from an intermediate point of the sleeve 24 through an opening 35 in the sleeve 27, said opening being large enough to provide for the permitted oscillation of the arm 32 and the required longitudinal adjustment of the reflector unit 22. The arm 34 provides a return bend portion 36 which freely receives the armature 28, mounts an insulated contact point 37 for coaction with a spring contact arm 38 which extends from the arm 32, and carries an adjustable stop screw 39 for engaging the arm 38 to limit the movement of the armature 28 toward the core 31.

An inner portion 41 of the support arm 34 extends radially from the sleeve 24, and a compression spring 42 is constantly operative between the portion 41 and an extension 43 of the member 33 whereby the armature 28 is normally held away from the core 31 to engage the contact arm 38 with the contact point 37 as a switch means. One terminal of the coil 29 is connected with a terminal of an electric battery 44 through a conductor 45 having a switch 46 interposed therein, the other coil terminal is connected to the contact point 37 by means of a conductor 47, the arm 38 is grounded through the tube 22, and the other battery terminal is grounded; this provides an operating current for operating the electromagnet motor when the switch 46 is closed, whereby to oscillate the reflector unit at a regulatable rate.

The tubular element 16 may be secured to any suitable support in accordance with the use requirements for the signal. As shown, the tube 16 is fixed to the rear wall of a protective casing 51 similar to those used for vehicle headlights to extend axially forwardly in the casing by means of a screw 52 extending through the casing wall and threadedly engaged in a block 53 fixed in the inner tube end. The front of the casing 51 is shown as open, but may be closed by a flat transparent pane if protection against the weather and/or dust is necessary. The inner surface of the casing 51 is, of course, non-reflecting to light and prevents the rearward escape of unreflected light from the lamp. A conductor 48 traverses the tube 16 and connects the insulated socket contact 17 with the conductor 45 through a switch 49 which is closed when the lamp is to be lit.

Figure 2 shows the signal image 62 which is produced by the lamp 11 in its disclosed relation to the reflector assembly 22. The arrangement is suitable for general use, and the structure may be made large or small as required. It is noted that the present cruciform image is completely balanced and of full intensity only when viewed from a point in or near the axis of the unit, is partially visible from points in the beams from any one of the reflector arms 18, and is relatively invisible from other points in front of it. The latter property of the image enables a person to center himself with respect to the axis of the signal beam; with the cross-shaped image shown, an aviator might, for instance, be guided to place his flying aircraft in a particular line of flight by reference to an image having the present qualities. It will be understood that the full image intensity provided only from points in the light beam from a reflector is the maximum possible by reason of the concentration of all reflected light in the relatively non-spreading beam.

In Figure 3, an image 63 produced by the reflector unit 22 is shown as rotated through a forty-five degree angle from its position in Figure 2 and as it would be produced from a lamp which is completely shaded at its forward end whereby the rays of the signal image are unconnected; this arrangement is particularly useful as a crossing signal. When such a unit is installed at a highway crossing of a railroad, the reflector unit might be controlled for its oscillation only during the approach of a train thereto, thereby providing a crossing light and wig-wag signal in one structure.

In Figure 4, light units 64 are provided having but three reflector arms, two vertical and one horizontal, and the supporting casing is shaped accordingly. This embodiment is particularly valuable for installation on a motor vehicle 65 to provide constantly lit riding lights at opposite sides of the vehicle with horizontal image arms pointing outwardly of the line of the upright image arms. One or more of the signal units 64 might be normally unlit whereby they may be lit as turn signals on and for the vehicle.

From the foregoing description taken in connection with the accompanying drawings, the advantages of the construction and method of use will be readily understood by those skilled in the art to which this invention appertains. While I have described the features and principles of operation of structures which I now consider to be preferred embodiments of my invention, I desire to have it understood that the present showing is primarily illustrative, and that such changes may be made, when desired, as fall within the scope of the following claims.

I claim:

1. In combination with a light source, an optical signal means comprising a convex reflector providing a specular band surface fixedly spaced from the light source and radiating from the axis of generation of said surface and constantly operative to project the light striking it from said source in a distinctly bounded beam which is visible as a light band and in its full intensity only when it is viewed from a point in the beam and means whereby the light from said source which does not strike said specular band surface is kept away from said beam.

2. In combination with a lamp providing a source of light, an optical signal means comprising a reflector unit disposed behind the lamp and having a plurality of elongated convex reflectors radiating from a common axis through the light source in mutually fixed relation and each operative to project the light striking it from said source in a distinctly bounded light beam which is visible as a light band only when it is viewed by looking from a point in a beam toward its corresponding reflector, and means providing a shade at the forward lamp end operative to prevent a direct projection of light forwardly from the lamp and into the beams from the reflectors.

3. A structure in accordance with claim 2 wherein the shade means provides an aperture at the lamp axis to permit a direct forward projection of light from the lamp in a limited beam along said axis to provide a common center for said light bands from the reflectors.

4. An optical signal means comprising a lamp providing a source of light, a fixed cylindric member mounting said lamp in axial alignment therewith, an elongated convex reflector disposed behind the lamp and extending radially from the axis of the cylinder member and formed to project the light striking it from said lamp in a beam which is sharply defined at its sides to provide a distinctly defined band image having the outline of the beam cross-section and which is visible with full intensity only when it is viewed from a point in the said beam, means mounting said reflector on said cylindric member for its rotation about the lamp axis, and means automatically coactive between the member and reflector to repetitively oscillate the latter about the former through a predetermined rotary angle while the lamp is lit.

5. In combination with a lamp providing a source of light, an optical signal means comprising a reflector unit disposed behind the lamp and providing a plurality of elongated convex reflectors radiating from a common axis through the light source in mutually fixed relation and each operative to forwardly project the portion of the light from said source which strikes it to provide a sharply bounded beam which is visible as a light band only when it is viewed by looking from a point in a beam toward its corresponding reflector, and means whereby only that portion of the rearwardly directed light from the lamp which strikes said reflectors is projected forwardly of the reflector unit.

6. A structure in accordance with claim 5 having means provided to oscillate the reflector unit about said axis repetitively through a predetermined and relatively small rotary angle while the lamp is lit.

AUGUSTA E. ROBERT.